United States Patent
Gretz (10) Patent No.: US 7,586,039 B1
(45) Date of Patent: Sep. 8, 2009

(54) HOLE SAW ELECTRICAL BOX FOR DIRECT MOUNTING OF ELECTRICAL FIXTURES OR DEVICES TO A WALL

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 65 days.

(21) Appl. No.: 12/008,120

(22) Filed: Jan. 9, 2008

(51) Int. Cl.
  *H01H 9/02* (2006.01)
(52) U.S. Cl. .................... 174/58; 174/481; 174/53; 174/57; 220/3.2; 220/3.3; 248/906
(58) Field of Classification Search .......... 174/480, 174/481, 50, 53, 57, 58, 61, 491, 496, 503, 174/63; 220/3.2–3.9, 4.02; 248/906, 343
See application file for complete search history.

(56) References Cited

U.S. PATENT DOCUMENTS

| | | | |
|---|---|---|---|
| 1,779,681 A * | 10/1930 | Smith et al. ............. | 248/906 |
| 3,214,126 A | 10/1965 | Roos | |
| 4,390,105 A * | 6/1983 | Graves ................... | 248/906 |
| 4,898,357 A * | 2/1990 | Jorgensen et al. ........ | 174/58 |
| 5,484,076 A | 1/1996 | Petrushka | |
| 5,609,414 A * | 3/1997 | Caluori .................. | 248/343 |
| 5,677,512 A | 10/1997 | Reiker | |
| 5,931,432 A * | 8/1999 | Herold et al. ........... | 248/343 |
| 6,100,469 A | 8/2000 | Jorgensen et al. | |
| 6,107,568 A | 8/2000 | Schnell et al. | |
| 6,336,613 B1 * | 1/2002 | Roth ..................... | 248/343 |
| 6,875,922 B1 * | 4/2005 | Petak et al. ............. | 174/58 |
| 7,170,003 B2 * | 1/2007 | Fields .................... | 174/58 |
| 7,208,680 B2 * | 4/2007 | Drane .................... | 174/58 |

* cited by examiner

*Primary Examiner*—Angel R Estrada (57) ABSTRACT

An electrical box assembly for mounting an electrical device or fixture on a wall. The electrical box assembly includes a box having a back wall and a sidewall defining an enclosure, and flanges and bosses extending outward from the sidewall. Teeth are provided along the outer sidewall of the box in alignment with and extending from each boss to the back wall. An elongated bracket with resilient legs is adjustably connected to the back wall of the box. After a hole is made in the drywall, the teeth rip a path for the bosses as the electrical box assembly is pushed into the hole. An adjustment arrangement including fasteners is provided for adjusting the distance of the bracket with respect to the box and securing the box to the wall. The clamping action of the bracket legs and flange on the drywall hold the electrical box assembly secure to the wall.

16 Claims, 9 Drawing Sheets

HOLE SAW ELECTRICAL BOX FOR DIRECT MOUNTING OF ELECTRICAL FIXTURES OR DEVICES TO A WALL

FIELD OF THE INVENTION

This invention relates to electrical boxes for mounting an electrical device or light fixture to a wall and specifically to an electrical box for mounting an electrical device or light fixture to a wall in a retrofit application.

BACKGROUND OF THE INVENTION

To improve the lighting or electrical access in their homes, homeowners frequently retrofit their homes with additional electrical devices or light fixtures. Typically this is done by locating an appropriate stud, removing the sheetrock, and installing a standard electrical box that is secured to the studs with fasteners. This method typically involves replacing or repairing a substantial amount of sheetrock around the newly installed electrical box.

An alternative method includes a junction box with flip out clamps. In this method, a hole is made in the sheetrock and the electrical box including the flip out clamps is pushed through the hole. The clamps, which are then located behind the sheetrock, are then rotated outwards from the box and fasteners tightened to draw the clamps and box tight against the sheetrock. One problem with this method is that the homeowner must make a hole large enough to accommodate the flip out clamps that extend outward from the sidewalls of the electrical box. Frequently the homeowner makes a hole with a hole saw and then must enlarge the hole around the perimeter to accommodate each of the clamps. This involves more time than simply providing a round hole with a hole saw. Additionally, once the electrical box is pushed through the sheetrock, the clamps are out of view and it is difficult to determine whether the clamps are rotated to the proper position for tightening the box to the sheetrock.

What is needed is an inexpensive, mechanically simple electrical box that can be quickly installed on a wall with minimal effort. Installation of the box should require only a circular hole. The electrical box should be capable of supporting electrical devices and lightweight lighting fixtures such as sconce lights.

SUMMARY OF THE INVENTION

The invention is an electrical box assembly for mounting an electrical device or fixture on a wall. The electrical box assembly includes a box having a back wall and a circular sidewall. The sidewall includes a rim, outwardly extending flanges, and bosses extending outward from the sidewall. Teeth are provided along the outer sidewall of the box in alignment with and extending from each boss to the back wall. An elongated bracket with resilient legs is adjustably connected to the back wall of the box. After a hole is made in the drywall, the teeth rip a path for the bosses as the electrical box assembly is pushed into the hole. An adjustment arrangement including fasteners is provided for adjusting the distance of the bracket with respect to the box. The fasteners of the adjustment arrangement are tightened to narrow the clearance between the box and the bracket and secure the box to the wall. The box is held secure to the wall by the clamping action of the bracket legs and flange on the drywall or similar wall covering.

OBJECTS AND ADVANTAGES

Several advantages are achieved with the electrical box assembly of the present invention, including:
 (1) The electrical box assembly can be used to provide an electrical device or fixture on a wall.
 (2) Only a simple circular hole is required in the drywall for mounting the electrical box assembly of the present invention to the wall.
 (3) All the hardware for securing the electrical box to the wall is included with the assembly.
 (4) Integral teeth are provided on the outer sidewall of the electrical box for ripping the drywall to accommodate passage of the bosses.
 (5) The electrical box assembly can be easily installed on a wall with minimal prep work as the assembly is simply pressed into a round hole that is easily made with a hole saw.
 (6) The electrical box assembly can accommodate any conventional light fixture and fixture bracket that is within the weight rating of the assembly.

These and other objects and advantages of the present invention will be better understood by reading the following description along with reference to the drawings.

INDEX TO REFERENCE NUMERALS IN DRAWINGS

20 electrical box assembly
22 electrical box
24 bracket 26 sidewall
28 back wall
30 boss
32 outer surface of sidewall
34 back end of boss
36 flat portion of sidewall
38 teeth
40 cavity or electrical box enclosure
42 rim
44 flange
46 wide portion of flange
48 narrow portion of flange
50 U-shaped notch
52 rib
54 recessed area
56 removable wall portion
58 knockout
60 aperture
62 perimeter wall
63 outer end of perimeter wall
64 bore
66 outer end of boss
68 center portion of bracket
70 leg
72 end
74 bend line
76 threaded bore in bracket
78 adjustment arrangement
80 fastener
82 electrical fitting
86 hole in drywall
88 drywall
90 wall
92 kerf
94 facet
96 inner side of tooth
98 outer side of tooth
100 centerline
$\Theta 1$ angle between legs and center portion of bracket
$D1$ inner diameter of hole in drywall
$D2$ distance across the center portion of the bracket

DETAILED DESCRIPTION OF THE INVENTION

Figure 1:
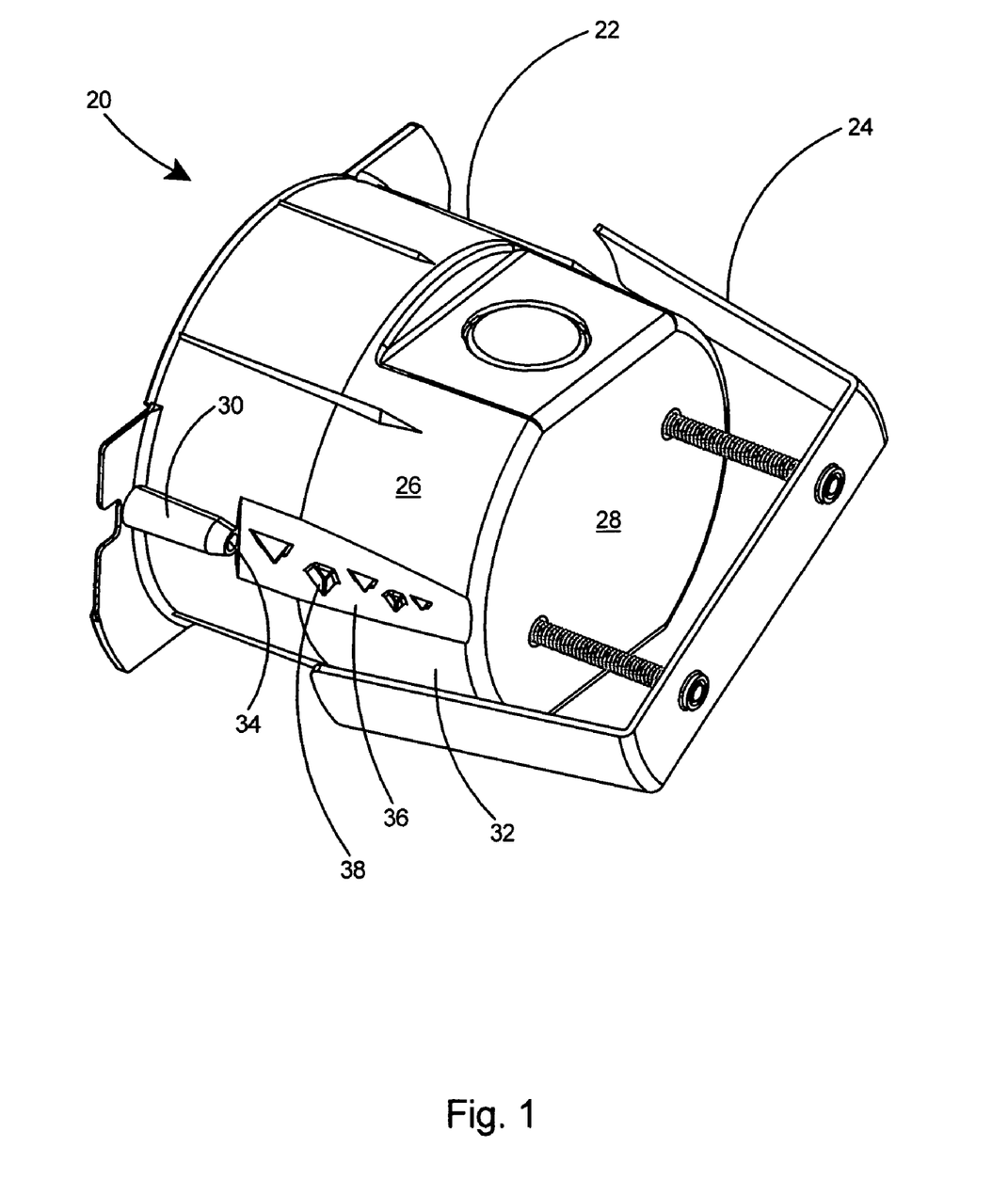
FIG. 1 is a perspective view of an especially preferred embodiment of an electrical box assembly according to the present invention.

With reference to FIG. 1 there is shown a preferred embodiment of the present invention, an electrical box assembly 20. The electrical box assembly 20 includes an electrical box 22 and a bracket 24 that is adjustable with respect to the electrical box 22. The electrical box 22 includes a sidewall 26, a back wall 28, and one or more bosses 30 extending from the outer surface 32 of the sidewall 26. The bosses 30 extend partially toward the back wall 28 of the electrical box 22 and terminate in a back end 34. The sidewall 26 includes a flat portion 36 extending from the back end 34 of each boss 30 to the back wall 28. A plurality of teeth 38 are provided in the flat portion 36 of the sidewall 26 extending between each boss 30 and the back wall 28.

Figure 2:
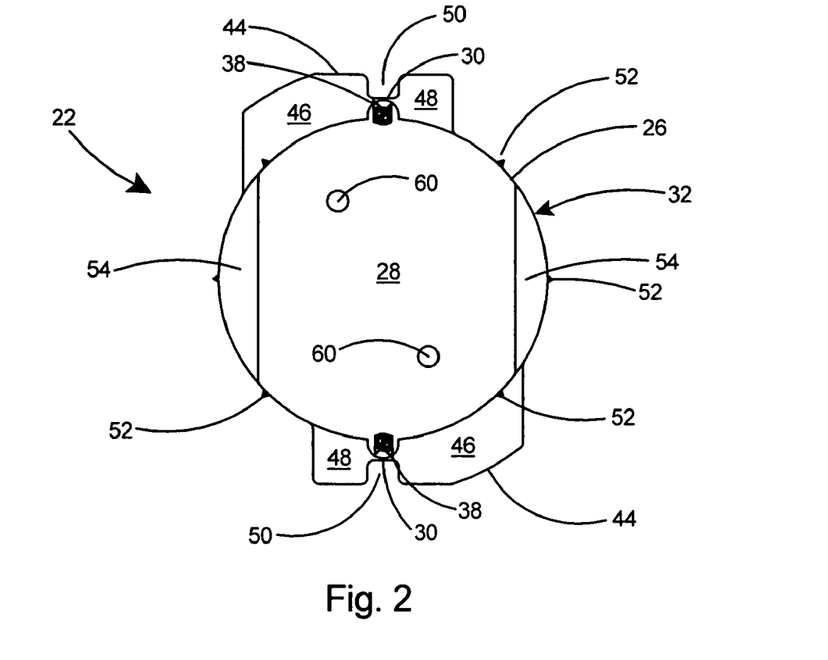
FIG. 2 is a front view of a box member that forms a portion of the electrical box assembly of FIG. 1.
Figure 3:
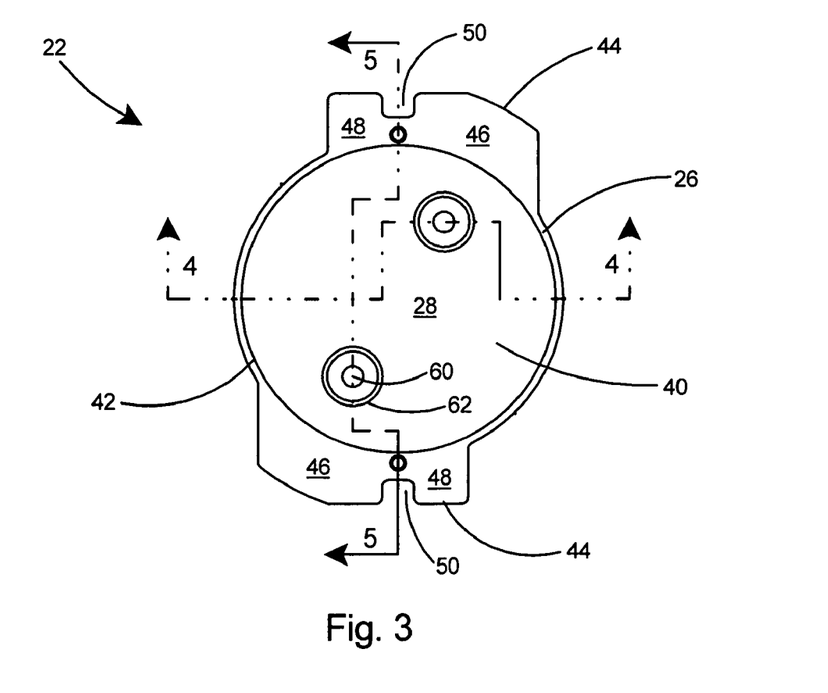
FIG. 3 is a rear view of the box member of FIG. 2.

Referring to FIGS. 2 and 3, the back wall 28 and sidewall 26 of the electrical box 22 define a cavity 40 (see FIG. 3) therein for accepting electrical cables and wiring connections (not shown) therein. The electrical box 22 includes a rim 42 and flanges 44 extending from opposing sides of the rim 42. The flanges 44 include a wide portion 46, a narrow portion 48, and a U-shaped notch 50. As shown in the top view of the electrical box 22 in FIG. 2, the U-shaped notches 50 are aligned with each of the bosses 30 that are located on opposing sides of the electrical box 22. The electrical box 22 preferably includes two bosses 30 on opposing sides of the sidewall 26 or rim 42 and preferably includes two of the flanges 44 extending around the bosses 30. A plurality of ribs 52 are provided extending from the outer surface 32 of the sidewall 26. The sidewall 26 is substantially circular in shape.

Figure 4:
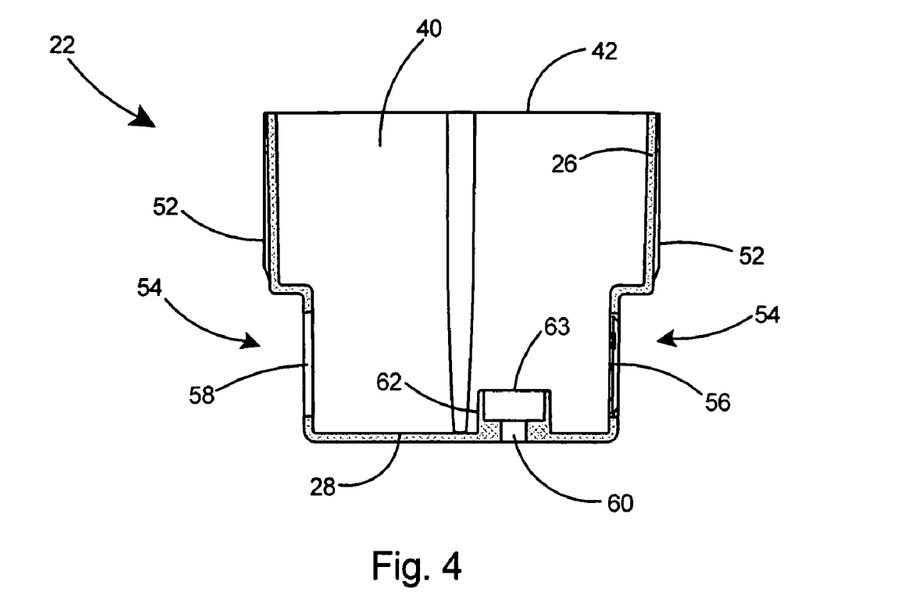
FIG. 4 is a sectional view of the box member taken along line 4-4 of FIG. 3.
Figure 5:
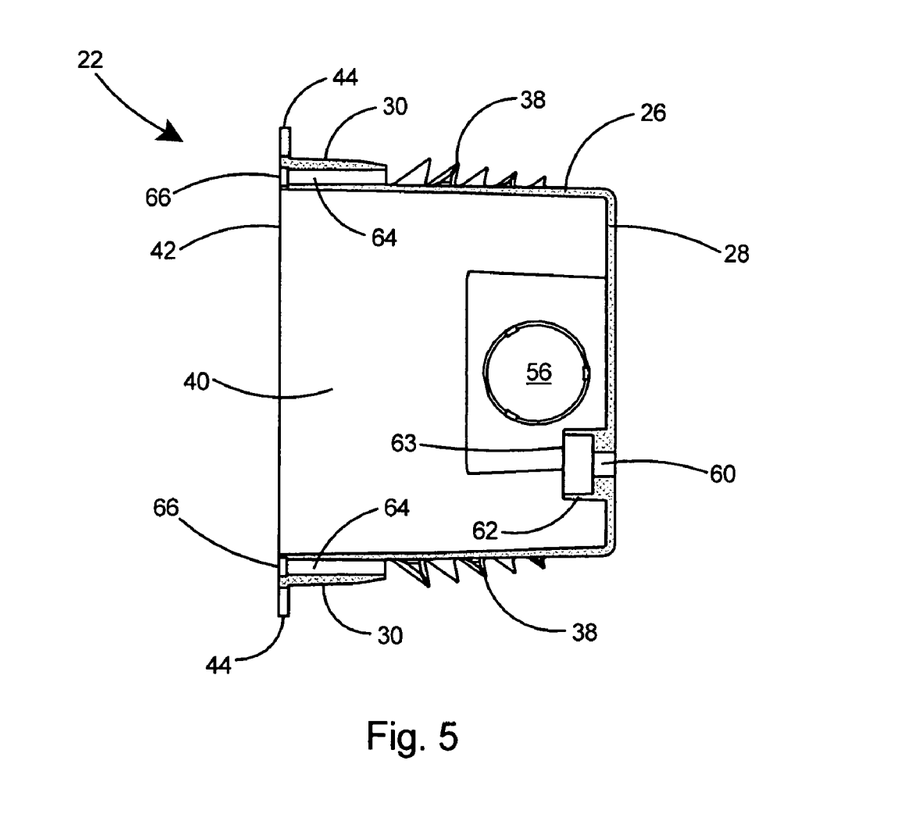
FIG. 5 is a sectional view of the box member taken along line 5-5 of FIG. 3.
Figure 6:
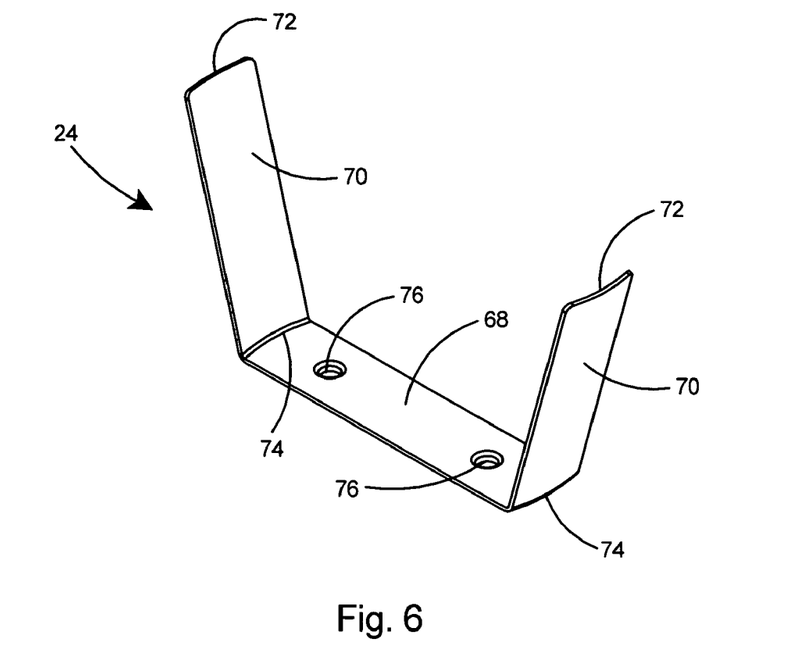
FIG. 6 is a perspective view of a bracket that forms a portion of the electrical box assembly of FIG. 1.

As shown in FIGS. 4 and 5, the electrical box 22 further includes one or more recessed areas 54 in the sidewall 26. The recessed areas 54 preferably include a removable wall portion 56 which can be removed to create an aperture or knockout 58 for the receipt of an electrical fitting (not shown) therein. Apertures 60 are provided in the back wall 28 of the electrical box 22. A perimeter wall 62 is provided around each of the apertures 60 extending into the electrical box enclosure or cavity 40. Each perimeter wall 62 includes an outer end 63 that extends into the cavity 40. Each of the bosses 30 include bores 64 and an outer end 66, with the outer end 66 of each boss 30 being flush with the rim 42 of the electrical box 22. The perimeter walls 62 around each aperture 60 will provide protection and shield fasteners (not shown), which will later be inserted through the apertures 60, to protect the fasteners from making incidental contact with any exposed wiring within the electrical box 22.

Figure 7:
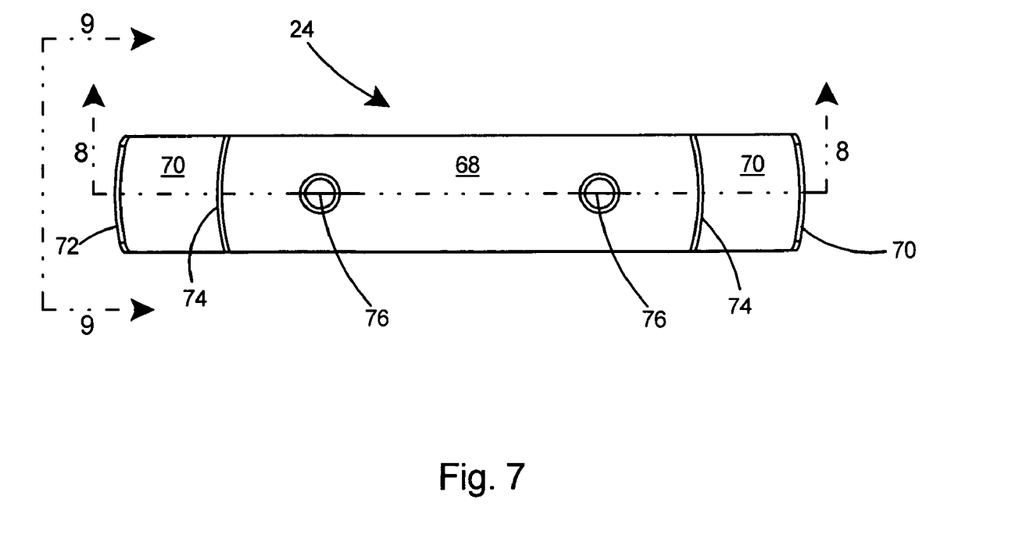
FIG. 7 is a top view of the bracket of FIG. 6.
Figure 8:
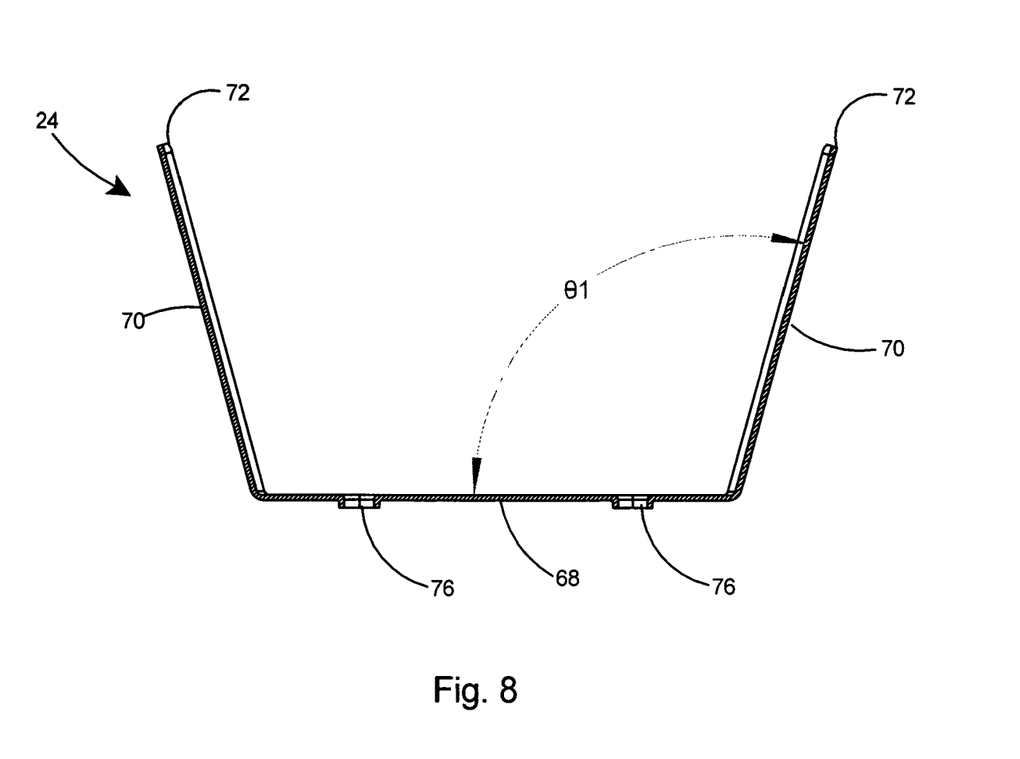
FIG. 8 is a sectional view of the bracket taken along line 8-8 of FIG. 7.
Figure 9:
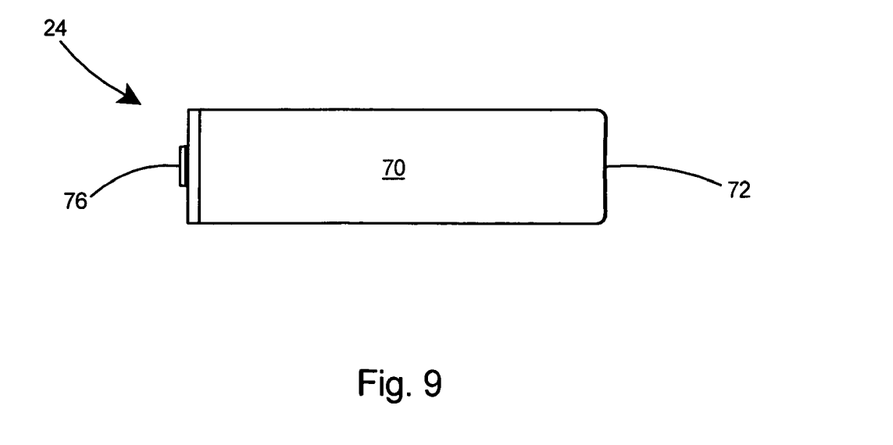
FIG. 9 is a side view of the bracket taken from line 9-9 of FIG. 7.

With reference to FIGS. 6-9, the bracket 24 portion of the electrical box assembly of the present invention includes a planar center portion 68, two outward-extending legs 70, and ends 72. As shown in FIG. 7, a bend line 74 is provided between the center portion 68 and the legs 70. As shown in FIG. 8, the legs extend outward at an angle $\Theta 1$ from the center portion 68 of the bracket 24 with angle $\Theta 1$ preferably between 95 and 115 degrees. The bracket 24 is preferably constructed of resilient metal and of such a thickness that the bracket 24 will flex inward at the bend line 74 when the electrical box assembly is pressed within a hole in a wall (not shown). The center portion 68 includes two threaded bores 76.

Figure 10:
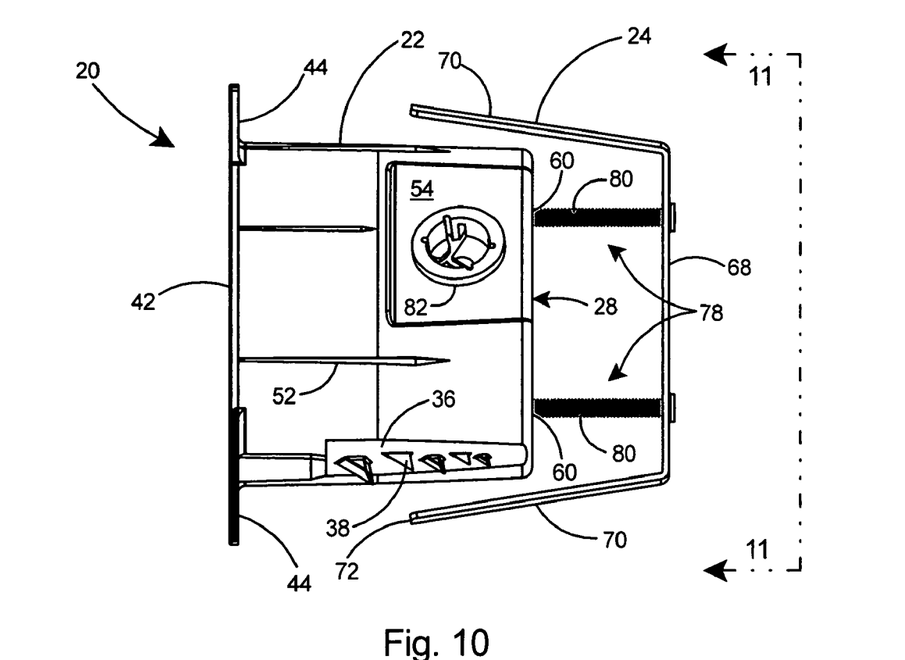
FIG. 10 is a side view of the electrical box assembly of FIG. 1.
Figure 11:
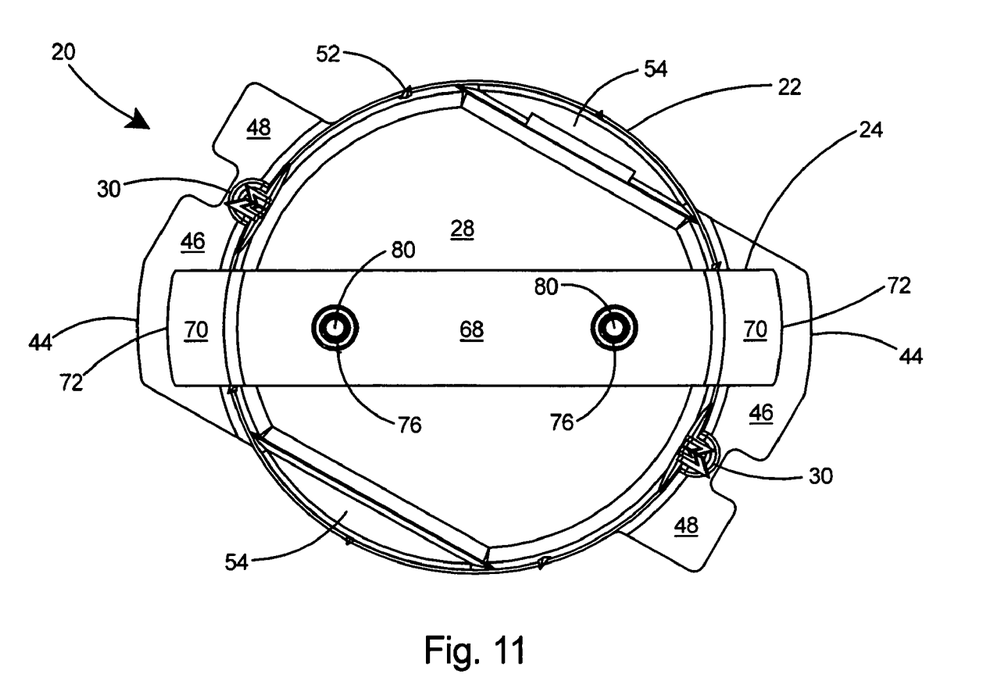
FIG. 11 is an end view of the electrical box assembly taken from line 11-11 of FIG. 10.

Referring to FIGS. 10 and 11, the electrical box assembly 20 of the present invention includes an adjustment arrangement 78 for adjusting the distance between the bracket 24 and the electrical box 22. The adjustment arrangement 78 includes threaded fasteners 80 extending through the apertures 60 in the back wall 28 of the electrical box 22 and through the threaded bores 76 in the center portion 68 of the bracket 24. The oversize apertures 60 in the back wall 28 of the electrical box 22 are of a larger diameter than the threads of the fasteners 80 thereby enabling the fasteners 80 to turn freely in the apertures 60 in the back wall. Turning the fasteners 80 thereby adjusts the distance of the bracket 24 with respect to the electrical box 22. The ends 72 of the bracket 24 extend beyond the sidewalls 26 of the electrical box 22 as shown in FIG. 11. In the electrical box assembly 20, the ends 72 of the bracket 24 are in alignment with the wide portion 46 of the flanges 44. As shown in FIG. 10, the recessed area 54 in the sidewall 26 of the electrical box 22 includes an electrical fitting 82 therein that has been inserted in a knockout aperture. An electrical fitting 82 such as the "BLACK BUTTON™" connector available from Arlington Industries, Inc., of Scranton, Pa., can be inserted within the aperture, frictionally held therein as shown. The "BLACK BUTTON™" connector is disclosed in U.S. Pat. No. 5,693,910, the entire contents of which are incorporated herein by reference.

Figure 12:
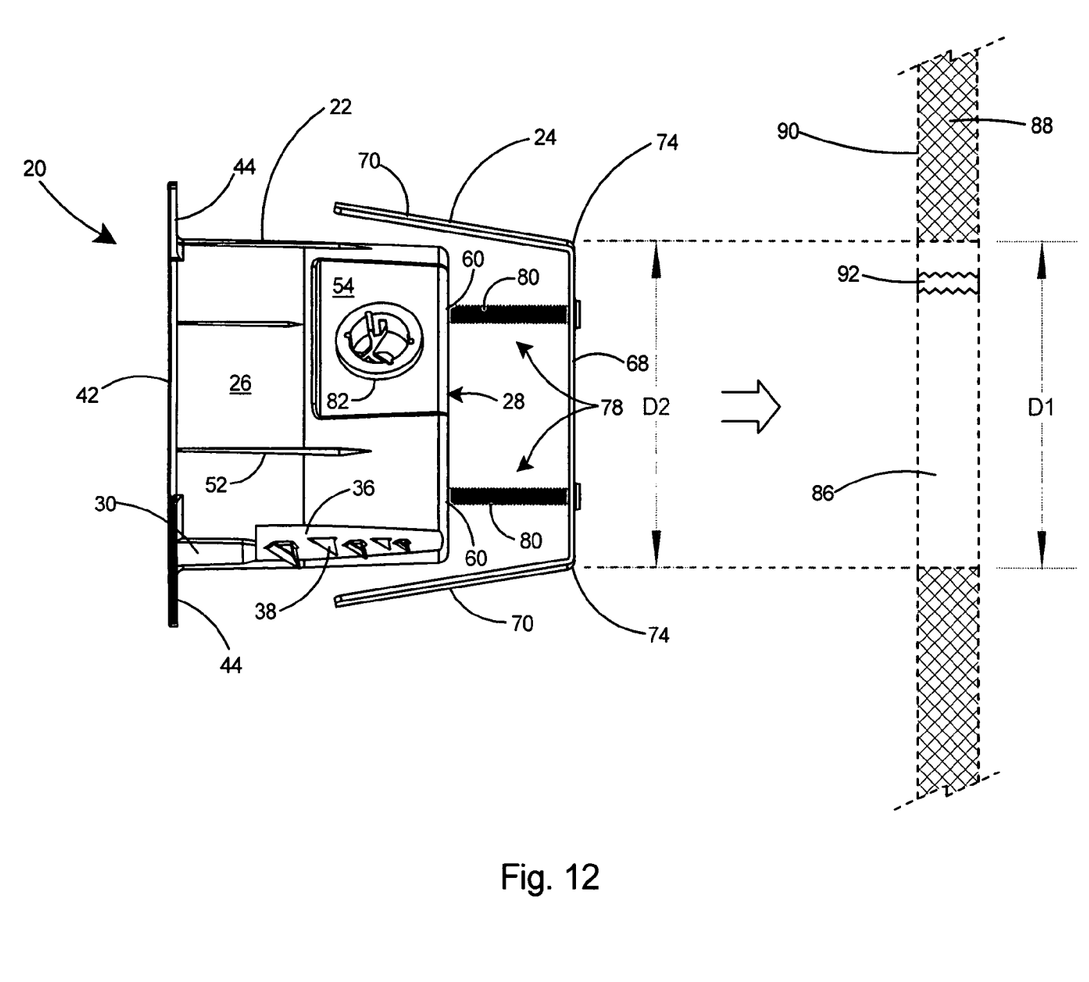
FIG. 12 is a side view of the electrical box assembly of the present invention being fitted into a hole in the drywall.

The reader is directed to FIG. 12 for an explanation of the operation of the hole saw box of the present invention. The hole saw box assembly 20 of the present invention is used to mount an electrical fixture or an electrical device (not shown) to a wall or ceiling of a structure. The electrical box assembly 20 of the present invention is typically provided in one piece, with the electrical box 22 connected to the bracket 24 by the adjustment arrangement 78. To accommodate an electrical box assembly 20 having a nominal interior volume of 17.5 cubic inches according to the present invention, a 3.25 inch diameter hole 86 is created in the drywall 88 using a 3.25 inch diameter hole saw (not shown) or similar tool. The hole diameter D1 is slightly greater in size than the distance D2 across the center portion 68 of the bracket 24. Therefore, as the electrical box assembly 20 is advanced to the hole 86, the center bracket portion 68 of the electrical box assembly 20 enters the hole 86 in the drywall 88. Slight pressure on the electrical box assembly 20 causes the legs 70 of the bracket 24 to collapse toward the sidewall 26 of the electrical box 22 thereby enabling a greater portion of the electrical box 22 to enter the hole 86. As the teeth 38, which extend outward of the sidewall 26 of the electrical box 22, contact the drywall 88 they rip a kerf 92 in the drywall 88. The kerf 92, depicted for the row of teeth out of view on the back side of the electrical box 22, creates a path or notch through which the bosses 30 will easily pass. Placing the bosses 30 outward of the sidewall 26 instead of inside the inner cavity of the electrical box 22 enables a larger inner cavity for electrical wiring and connections. The integral teeth 38 therefore enable an electrical box assembly 20 including external bosses 30 according to the present invention to pass through the drywall 88 while at the same time not widening the hole 86 excessively. The kerf 92 created by the teeth 38 of the enable electrical box 22 and bosses 30 to pass through the drywall 88 until the bracket 24 clears the drywall 88 and expands outward to its unbiased shape and the flange 44 seats on the wall 90.

Figure 13:
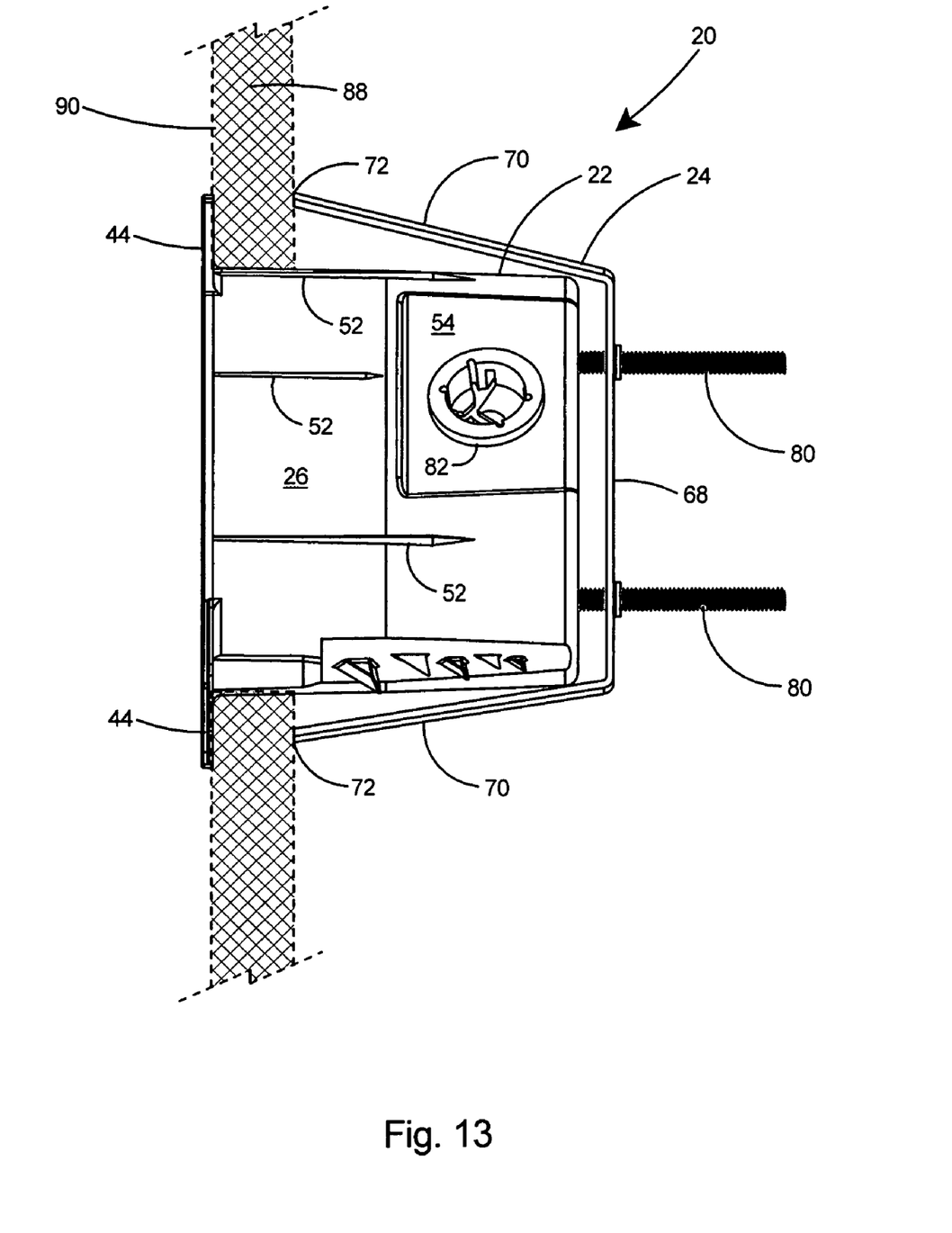
FIG. 13 is a side view of the electrical box assembly of the present invention after being secured to the drywall.

With reference to FIG. 13, after the bracket 24 has cleared the drywall 88 and the flanges 44 are seated on the wall 90, the fasteners 80, which are accessible from the inner cavity of the box, are tightened until the ends 72 of the bracket 24 are drawn tightly against the drywall 88. The drywall 88 is clamped between the wide portion of flange 44 and the legs 72 of the bracket 24. With the electrical box 22 fastened securely to the wall 90, as shown in FIG. 13, an electrical fixture or electrical device (not shown) may be secured to the electrical box 22. The plurality of ribs 52 bite into the drywall 88 and thereby assist in preventing any rotational forces from moving or twisting the box with respect to the wall 90. After the electrical box assembly 20 is secured to the wall 90, the teeth 38 are safely situated behind the drywall 88. The electrical box assembly 20 of the present invention, designed specifically for direct mounting to drywall, is capable of supporting a load of up to 3 pounds on a ceiling, wall, or other drywall surface.

Figure 14:
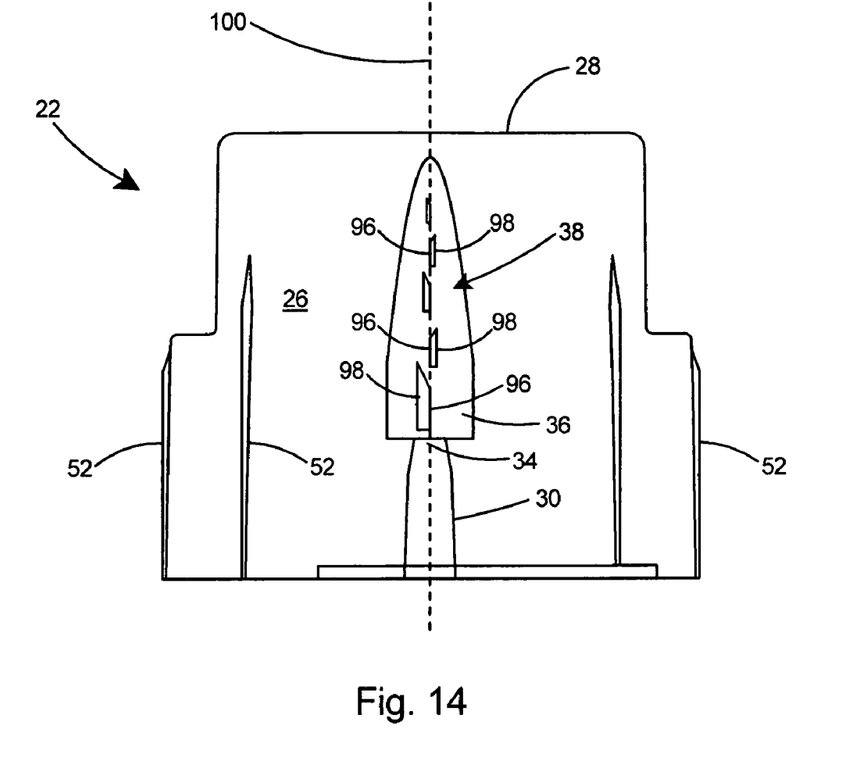
FIG. 14 is a side view of the electrical box portion depicting the teeth extending from the sidewall of the box.
Figure 15:
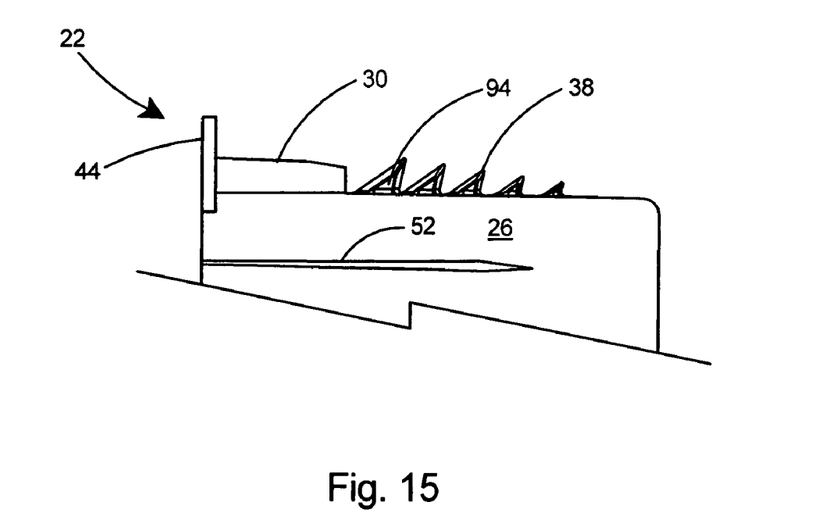
FIG. 15 is an expanded side view of a portion of the sidewall of the electrical box including the teeth.

Referring to FIGS. 14 and 15, the teeth 38 preferably increase in size from the back wall 28 to the back end 34 of the boss 30. This enables the size of the kerf to be gradually increased as each tooth is pressed through the drywall 88 (see FIG. 12). Preferably, as shown in FIG. 15, the teeth 38 each include facets 94 thereon. The facets 94 provide sharp edges for enhancing the cutting action of the teeth 38. As shown in FIG. 14, the teeth 38 further include inner sides 96 and outer sides 98, the flat portion 36 of the sidewall 26 includes a centerline 100, and the inner sides 96 of the teeth 38 are preferably aligned with the centerline 100. By aligning the inner sides 96 of the teeth 38 with the centerline 100, and increasing the size of the teeth 38 from the back wall 28 to the boss 30, a kerf 92 (see FIG. 12) is preferably formed which provides adequate clearance for the bosses 30 to pass through the drywall 88.

The electrical box 22 portion of the electrical box assembly 20 of the present invention may be constructed of metal or plastic but is most preferably molded in one piece of plastic. The teeth 38 are preferably molded integrally with the electrical box 22. The electrical box 22 can be molded of any suitable plastic including polycarbonate, polyvinylchloride, acrylonitrile butadienestyrene, or a polyolefin. The bracket 24 is preferably formed of a sheet metal such as steel. An especially preferred material of construction is 0.030 to 0.040 inch thick steel, including grades 1050 or 1074 steel hardened and tempered to a Rockwell hardness (Rc) of 44 to 48. This thickness enables the legs 70 of the bracket 24 to flex properly at the bend lines 74 (see FIG. 12) as the electrical box assembly 20 is advanced through the drywall 88.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. An electrical box assembly comprising:
   an electrical box including a back wall and a substantially circular sidewall defining a cavity therein;
   a bracket adjustable with respect to said back wail of said electrical box; one or more bosses extending from the outer surface of said sidewall of said electrical box, said bosses extending partially toward said back wall of said electrical box and terminate in a back end, said sidewall includes a flat portion extending from said back end of said bosses to said back wall;
   a plurality of teeth extending along said sidewall of said electrical box between each of said bosses and said back wall; an adjustment arrangement for adjusting the distance between said bracket and said box; and
   a flange extending from said sidewall of said box.

2. The electrical box assembly of claim 1 wherein said teeth increase in size from said back wall to said back end of said boss.

3. The electrical box assembly of claim 2 wherein said teeth include
   facets thereon; and
   said teeth include inner sides and outer sides.

4. The electrical box assembly of claim 3 wherein
   said teeth extend from said flat portion of said sidewall;
   said flat portion includes a centerline; and
   said inner sides of said teeth are aligned with said centerline.

5. The electrical box assembly of claim 1 wherein said adjustment arrangement includes
   apertures in said back wall of said box;
   threaded fasteners extending through said apertures in said back wall, said fasteners capable of turning freely in said apertures in said back wall; and
   threaded apertures in said bracket;
   whereby turning of said fasteners adjusts the distance of said bracket with respect to said box.

6. The electrical box assembly of claim 5 including a perimeter wall surrounding said aperture in said back wall of said box, said perimeter wall having an outer end extending into said cavity.

7. The electrical box assembly of claim 1 wherein
   said bracket includes ends; and
   said ends of said bracket extend beyond said sidewalls of said box.

8. The electrical box assembly of claim 1 wherein said bracket includes
   a planar center portion and two outward-extending legs;
   a bend line between said center portion and said legs; and said bracket constructed of resilient metal such that said bracket will flex inward at said bend line when said electrical box assembly is pressed within a hole in a wall.

9. The electrical box assembly of claim 8 wherein said legs extend outward at an angle of between 95 and 115 degrees from said center portion of said bracket.

10. The electrical box assembly of claim 1 wherein
said flange includes a U-shaped notch; and
said U-shaped notch is aligned with said boss.

11. The electrical box assembly of claim 10 wherein
said electrical box includes a rim;
said electrical box includes two of said bosses on opposing sides of said rim;
said electrical box includes two of said flanges said flanges extending around said bosses.

12. The electrical box assembly of claim 11 wherein
said bosses include an outer end; and
said outer end of said bosses are flush with said rim.

13. The electrical box assembly of claim 1 wherein said box is capable of supporting 3 pounds.

14. An electrical box assembly comprising:
an electrical box including a back wall and a sidewall defining a cavity therein;
a bracket adjustable with respect to said back wall of said electrical box;
one or more bosses extending from the outer surface of said sidewall of said electrical box;
a plurality of teeth extending along said sidewall of said electrical box between each of said bosses and said back wall;
an adjustment arrangement for adjusting the distance between said bracket and said box; and
a flange extending from said sidewall of said box;
one or more recessed areas in said sidewall of said box; and
said recessed areas including a removable wall portion therein, whereby removal of said removable wall portion provides an aperture therein.

15. The electrical box assembly of claim 14 wherein said aperture in said recessed area includes an electrical fitting therein.

16. An electrical box assembly for attachment to a wall of drywall construction with a circular hole therein comprising:
an electrical box including a back wall and a substantially circular sidewall defining a cavity therein, said sidewall including an outer surface;
a bracket adjustable with respect to said back wall of said electrical box;
one or more bosses extending from said outer surface of said sidewall of said electrical box;
a plurality of teeth in alignment with and extending along said sidewall of said electrical box between each of said bosses and said back wall;
said teeth on said sidewall of said electrical box enable ripping of said drywall thereby providing a kerf in said drywall for accommodating passage of said bosses through said drywall;
an adjustment arrangement for adjusting the distance between said bracket and said electrical box; and
a flange extending from said sidewall of said electrical box.

* * * * *